United States Patent
DehghanNiri et al.

(10) Patent No.: US 10,919,285 B2
(45) Date of Patent: Feb. 16, 2021

(54) METHOD AND SYSTEM FOR X-RAY BACKSCATTER INSPECTION OF ADDITIVE MANUFACTURED PARTS

(71) Applicant: General Electric Company, Schenectady, NY (US)

(72) Inventors: Ehsan DehghanNiri, Glenville, NY (US); Srikanth Chandrudu Kottilingam, Simpsonville, SC (US); Claude Leonard Going, Jr., Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 15/344,677

(22) Filed: Nov. 7, 2016

(65) Prior Publication Data

US 2018/0126670 A1    May 10, 2018

(51) Int. Cl.
 *B29C 64/386* (2017.01)
 *B33Y 10/00* (2015.01)
 (Continued)

(52) U.S. Cl.
 CPC ............ *B33Y 10/00* (2014.12); *B22F 3/1055* (2013.01); *B29C 64/10* (2017.08); *B29C 64/153* (2017.08);
 (Continued)

(58) Field of Classification Search
 None
 See application file for complete search history.

(56) References Cited

U.S. PATENT DOCUMENTS 5,416,321 A * 5/1995 Sebastian ............... G01N 21/88
 250/288
9,001,121 B2 * 4/2015 Finlayson ............... G01S 5/166
 345/420
(Continued)

FOREIGN PATENT DOCUMENTS

DE   112015004279 T5   6/2017
WO   2016/042810 A1    3/2016
WO   2016/085334 A2    6/2016

OTHER PUBLICATIONS

Extended European Search Report and Opinion issued in connection with corresponding EP Application No. 17200120.8 dated Apr. 24, 2018.

*Primary Examiner* — Monica A Huson
*Assistant Examiner* — Kelsey C Grace
(74) *Attorney, Agent, or Firm* — James Pemrick; Hoffman Warnick LLC

(57) ABSTRACT

A method for inspection of additive manufactured parts and monitoring operational performance of an additive manufacturing apparatus is provided. The method includes a step of obtaining, in real-time during an additively manufactured build process, a backscatter x-ray scan of an area of a build platform. The build platform is configured for supporting at least one part during the build process. An evaluating step evaluates, by a processor, the backscatter x-ray scan. A determining step determines, based on the evaluating, whether an operational flaw with the additive manufacturing apparatus has occurred or a defect in the at least one part has occurred. A backscatter x-ray system has an emitter that emits x-rays and a detector that receives backscattered x-rays. The emitter and detector are located on a movable support located above the build platform, and the movable support raises and lowers the emitter and detector with respect to the build platform.

16 Claims, 7 Drawing Sheets

(51) Int. Cl.
  *B29C 64/268* (2017.01)
  *B29C 64/393* (2017.01)
  *B29C 64/10* (2017.01)
  *B22F 3/105* (2006.01)
  *B29C 64/245* (2017.01)
  *B29C 64/153* (2017.01)
  *B33Y 30/00* (2015.01)
  *B33Y 50/02* (2015.01)
  *G01N 23/203* (2006.01)
  *G01T 7/00* (2006.01)
  *G05B 19/4097* (2006.01)

(52) U.S. Cl.
  CPC .......... *B29C 64/245* (2017.08); *B29C 64/268* (2017.08); *B29C 64/386* (2017.08); *B29C 64/393* (2017.08); *B33Y 30/00* (2014.12); *B33Y 50/02* (2014.12); *G01N 23/203* (2013.01); *G01T 7/005* (2013.01); *G05B 19/4097* (2013.01); *B22F 2003/1056* (2013.01); *B22F 2003/1057* (2013.01); *B22F 2999/00* (2013.01); *G05B 2219/35134* (2013.01); *Y02P 10/25* (2015.11)

(56) References Cited

U.S. PATENT DOCUMENTS

| | | | |
|---|---|---|---|
| 2011/0114839 A1* | 5/2011 | Stecker | B22F 3/1055 250/307 |
| 2015/0037601 A1* | 2/2015 | Blackmore | B23K 15/0086 428/600 |
| 2016/0061991 A1 | 3/2016 | Berkcan et al. | |
| 2016/0279707 A1* | 9/2016 | Mattes | B41J 2/451 |

\* cited by examiner

METHOD AND SYSTEM FOR X-RAY BACKSCATTER INSPECTION OF ADDITIVE MANUFACTURED PARTS

BACKGROUND OF THE INVENTION

Additive manufacturing is a process by which a three-dimensional structure is built, usually in a series of layers, based on a digital model of the structure. The process is sometimes referred to as three-dimensional (3D) printing or 3D rapid prototyping, and the term "print" is often used even though some examples of the technology rely on sintering or melting/fusing by way of an energy source to form the structure, rather than "printing" in the traditional sense where material is deposited at select locations. Examples of additive manufacturing techniques include powder bed fusion, fused deposition modeling, electron beam melting (EBM), laminated object manufacturing, selective laser sintering (SLS), direct metal laser sintering (DMLS), direct metal laser melting (DMLM), selective laser melting (SLM), and stereolithography, among others. Although 3D printing technology is continually developing, the process to build a structure layer-by-layer is relatively slow, with some builds taking several days to complete.

One of the disadvantages of current additive manufacturing processing relates to quality assurance. There is typically some amount of analysis to determine whether the produced part meets the manufacturing thresholds and design criteria. In some examples, the part may have to be dissected in order to test whether a certain lot of products or a sampling has satisfied the design limits. This can lead to considerable inefficiency when, for example, it is later determined that a production lot is defective due to a machining or design problem.

BRIEF DESCRIPTION OF THE INVENTION

According to one aspect, a method for inspection of additive manufactured parts and monitoring operational performance of an additive manufacturing apparatus is provided. The method includes a step of obtaining, in real-time during an additively manufactured build process, a backscatter x-ray scan of an area of a build platform. The build platform is configured for supporting at least one part during the build process. An evaluating step evaluates, by a processor, the backscatter x-ray scan. A determining step determines, based on the evaluating, whether an operational flaw with the additive manufacturing apparatus has occurred or a defect in the at least one part has occurred.

According to another aspect, a system for inspection of additive manufactured parts and monitoring operational performance of an additive manufacturing apparatus includes a backscatter x-ray system having an emitter that emits x-rays and a detector that receives backscattered x-rays, a memory, and a processor in communication with the memory. The system is configured to perform the following steps. An obtaining step for obtaining with the backscatter x-ray system, in real-time during an additively manufactured build process, a backscatter x-ray scan of an area of a build platform. The build platform is configured for supporting at least one part during the build process. An evaluating step for evaluating, by a processor, the backscatter x-ray scan. A determining step for determining, based on the evaluating, whether an operational flaw with the additive manufacturing apparatus has occurred or a defect in the at least one part has occurred.

According to yet another aspect, a computer program product for inspection of additive manufactured parts and monitoring operational performance of an additive manufacturing apparatus is provided. The computer program product has a non-transitory computer readable storage medium readable by a processor and for storing instructions for execution by the process to perform a method. The method includes obtaining, in real-time during an additively manufactured build process, a backscatter x-ray scan of an area of a build platform. The build platform configured for supporting at least one part during the build process. The method includes an evaluating step for evaluating, by a processor, the backscatter x-ray scan, and a determining step for determining, based on the evaluating, whether an operational flaw with the additive manufacturing apparatus has occurred or a defect in the at least one part has occurred.

Additional features and advantages are realized through the concepts of aspects of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
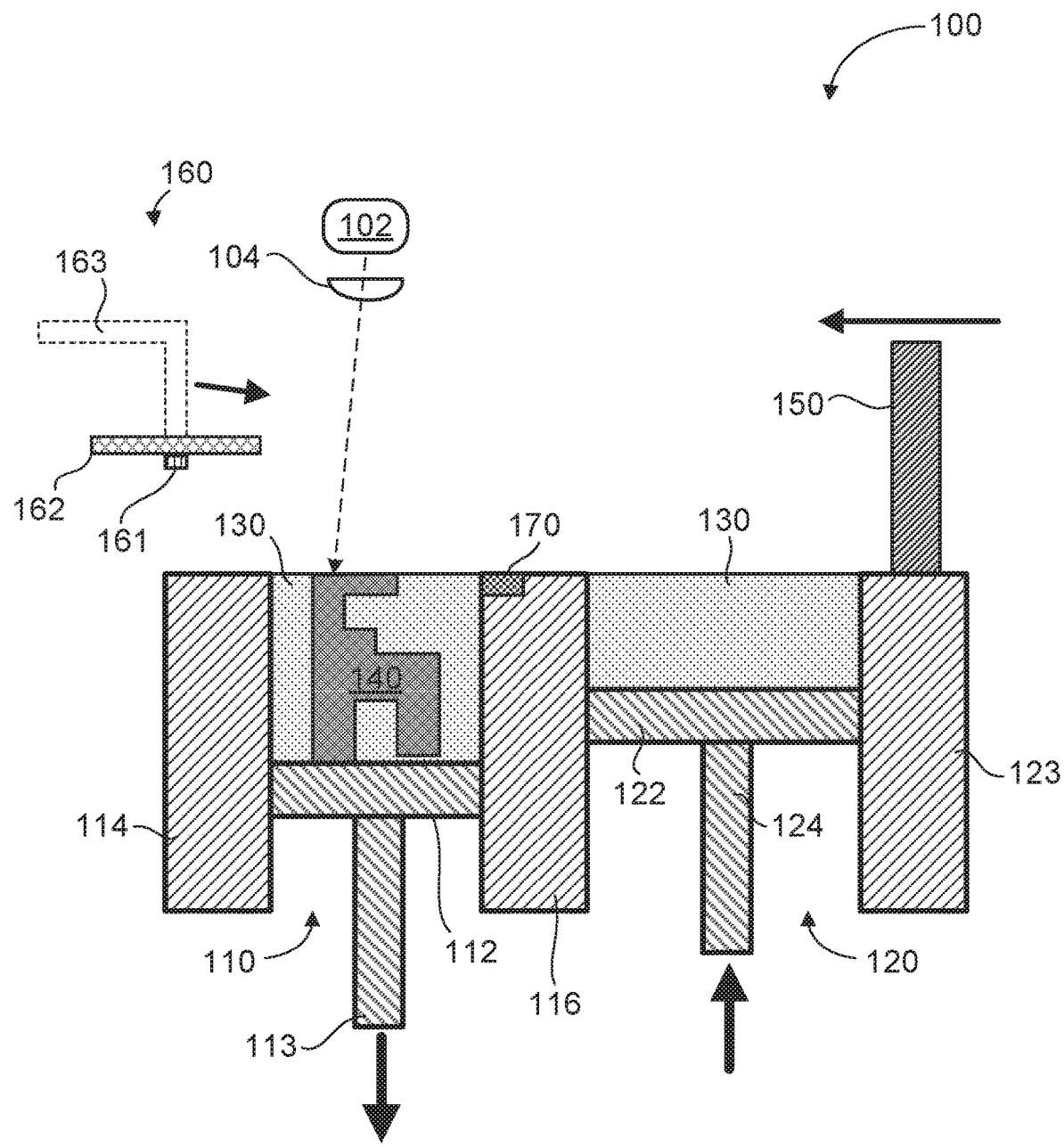
FIG. 1 illustrates a cross-sectional view of an additive manufacturing apparatus, in accordance with aspects described herein.

The phrase "additive manufacturing apparatus" is used interchangeably herein with the phrase "printing apparatus" and term "printer", and the term "print" is used interchangeably herein with the word "build", referring to the action for building a structure by an additive manufacturing apparatus, regardless of the particular additive manufacturing technology being used to form the structure. The terms "structure" and "part" are also used interchangeably, and both terms refer to an additively manufactured physical object (e.g., a machine part, a tool, or etc.). As used herein, print and printing refer to the various forms of additive manufacturing and include three-dimensional (3D) printing or 3D rapid prototyping, as well as sintering or melting/fusing technologies. Examples of additive manufacturing or printing techniques include powder bed fusion, fused deposition modeling, electron beam melting (EBM), laminated object manufacturing, selective laser sintering (SLS), direct metal laser sintering (DMLS), direct metal laser melting (DMLM), selective laser melting (SLM), and stereolithography, among others.

Assurance that a build process is progressing as planned is important for cost and quality reasons. At the end of a build cycle to build one or more three-dimensional parts, an operator of the additive manufacturing apparatus may find that the parts are defective or unusable because of a failure with the additive manufacturing apparatus during the build cycle. This can be especially problematic when building expensive parts, such as molds for casting structures having complex geometries.

A backscatter x-ray inspection and monitoring system and method are disclosed herein that may be used to monitor the building of layers of one or more objects being built by an additive manufacturing apparatus, and, in one embodiment, to detect operational flaws as they occur, (i.e. during the build process rather than afterward, as an example). In a further embodiment, evaluation/analysis of backscatter x-ray scans acquired during the build process is performed as part of post-processing (and not as part of the real-time acquisition of scanned data). Real-time acquisition as used herein refers to the scans of individual layer(s) of the structure as the structure is being built ("printed"). Real-time analysis refers to evaluation of the acquired backscatter x-ray scans of the various layers.

Operational flaws may include, as examples, errors with the part(s), build process, or additive manufacturing apparatus, or indicators that one or more errors are likely to occur with the part(s), build process, or additive manufacturing apparatus, or lack of fusion, porosity or micro/macro cracks. In some embodiments, action(s) may be taken responsive to observing that an operational flaw has occurred. For instance, remedial actions may be taken so that the flaw can be corrected, the build process stopped, the problem fixed, a new build started, etc. In other cases, a flaw may be detected but is determined to be insignificant, therefore the build process may continue.

Backscatter x-ray inspection is the nondestructive testing of objects through imaging of backscattered x-rays on the object's surface. Backscatter x-ray inspection is non-contact, non-intrusive, allows for detection of subsurface defects close to the surface, allows for inspection of large surfaces, and offers high speed inspection. In contrast to conventional x-ray testing (e.g., x-rays performed by a doctor or a dentist), backscatter x-rays typically do not pass completely through the object under test, but rather are reflected by the object after partially penetrating the object and are then detected by an imaging device or receiver on the same side of the object as the x-ray emitter. Any flaws present are detected as abnormalities in the x-ray image.

Provided is an ability to radiographically observe a build process that may take hours or days to complete in order to detect and react to potential operational flaws with the additive manufacturing apparatus and/or errors with one or more printed layers. Also provided is the ability to communicate indications of the operational flaws to operators early in the build process as, or before, they occur, so that a failed build can be stopped prior to its completion. A new build may then be started earlier than it otherwise would have been (i.e. had the failure been discovered only after the failed build process completes). From a manufacturing resources perspective, wasted materials usage and wasted build time are reduced. In addition, as described below, rather than stopping an entire build process, printing of individual parts that are showing flaws or otherwise undesired features can be turned off so as the flaws/features do not cause the build to fail, which could cause errors with all of the structures in the build. By terminating building of individual parts that are becoming problematic, manufacturing yields and machine uptime can be maximized. A notification or alert may also be provided to a user if a flaw or defect is detected.

Some problems that may be observed during the monitoring of a build process as described herein include, but are not limited to, dimensional errors, distortion, lack of fusion, porosity, micro cracking or macro cracking in the printed structures, malfunctioning of a roller/planarizer or other component of the printing apparatus, poor layer surface finish, delamination of the structures, misplacement, excess, or absence of build material, or any other additive manufacturing errors. In general, the monitoring can monitor for anything that can cause the built part to fail or that can indicate that that additive manufacturing apparatus has failed, is about to fail, or needs maintenance, as examples.

FIG. 1 depicts one example of an additive manufacturing apparatus, in accordance with aspects described herein. As is seen in FIG. 1, printing apparatus 100 (or an additive manufacturing apparatus) is a powder bed fusion type of 3D printing device that includes a laser 102 and lens 104. A build section 110 is located adjacent to a dispensing section 120. The build section includes the build platform 112, onto which the part 140 (e.g., the 3D printed part or structure) is built. The build platform is connected to a shaft or support 113 that lowers the build platform in increments as the part 140 is built. At the start of 3D printing, the build platform will be at a high position, and as each layer of the part 140 is formed the build platform will lower accordingly. The build platform 112 or build section 110 is enclosed on the sides by walls 114 and 116 (additional walls may be used, but are not shown).

The dispensing section 120 contains a supply of powder 130 supported by dispensing platform 122 and contained by walls 116 and 123. The dispensing platform 122 is raised up by shaft or support 124. When a new layer of powder is required in build section 110, the dispensing platform 122 will raise up by a predetermined amount so that recoating blade 150 can push the powder 130 from section 120 over to section 110. In this manner, a new layer of powder is spread over part 140 so that the laser 102 may fuse the next layer of the part 140. The recoating blade 150 will then return to its position above wall 123, and be ready for the next layer.

To inspect part 140 and monitor operational performance of the additive manufacturing apparatus 100, a backscatter x-ray system 160 is provided to obtain a backscatter x-ray scan of the build platform and upper layers of part(s) 140. The backscatter x-ray system includes an emitter 161 that emits x-rays and a detector 162 that receives the backscattered x-rays. A movable support 163 is attached to the detector/receiver and is configured to raise, lower and move the emitter 161 and detector 162 with respect to the build platform. In the backscatter x-ray system 160 a narrow x-ray beam is directed toward part 140 by emitter 161, and x-rays are backscattered from part 140 to detector 162 which receives the reflected x-rays. The backscatter signal of each point on the part may be measured and recorded in a processor or computer. For example, the captured backscattered x-ray image is processed, evaluated and then a determination may be made as to the presence or absence of defects in part 140.

Figure 2:
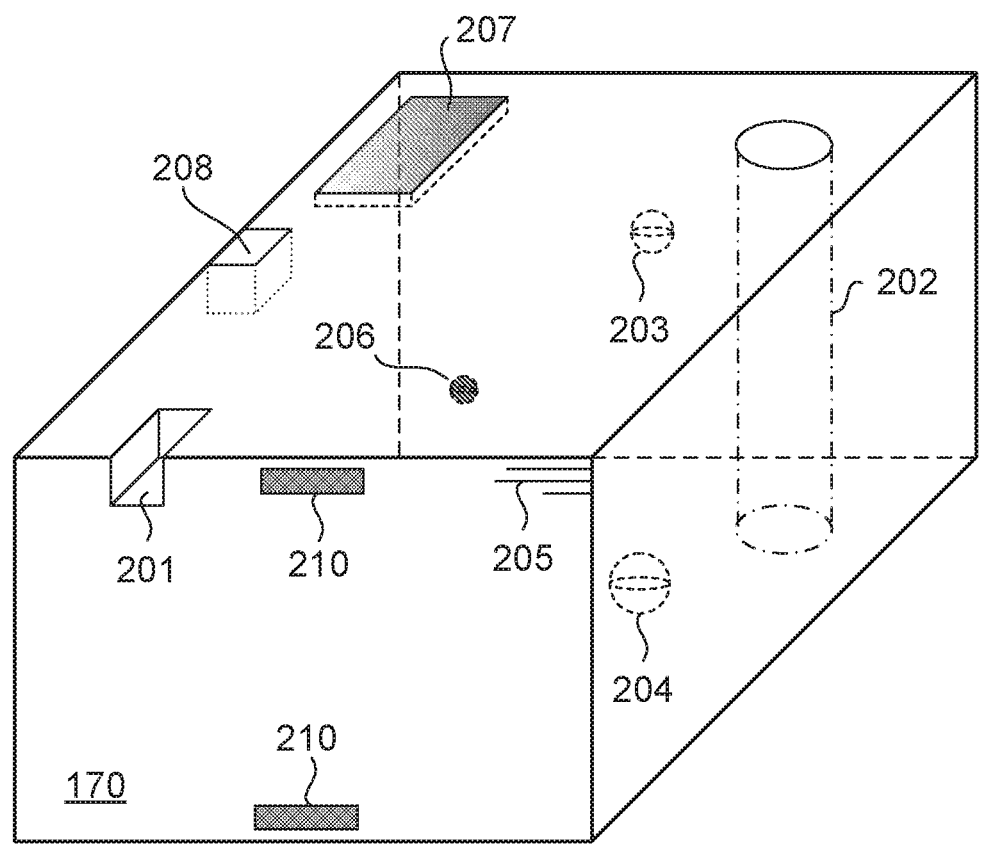
FIG. 2 illustrates a simplified view of a calibration block having known defects, in accordance with aspects described herein.

One or more calibration blocks 170 may be located on walls 114, 116 or on the build platform (not shown) to calibrate the backscatter x-ray system 160 prior to a scan operation. The calibration block(s) 170 are configured to be scanned by the backscatter x-ray system 160 by being placed within the field of view of the detector 162. The calibration block 170 may have different known artificial defects such as holes, notches, delamination, and voids that represent actual defects that can happen during the printing/build process. Referring to FIG. 2, a calibration block 170 is shown having various known defects and calibration areas. The known artificial defects may include a notch 201, hole 202, voids 203, 204, area of delamination 205, and inclusion 206 with different sizes at different depths. Calibration areas may include areas with known density, such as surface 207 with known x-ray reflectivity, area 208 of the same material as the powder with known thickness close to the desired layer thickness. Further, x-ray detectors 210 may be located at different locations on the calibration block to measure the absolute radiation power. Many different critical values such as sensitivity, signal to noise ratio and contrast can be measured using the designed calibration block of FIG. 2. Furthermore, the backscatter x-ray system 160 can be calibrated by first scanning the calibration block and comparing the result with a known good scan of the calibration block. If there are discrepancies beyond a predetermined threshold, then the backscatter x-ray system 160 response can be adjusted to normal expectations. Calibration can be done before every scan or after a selected number of scans.

Figure 3:
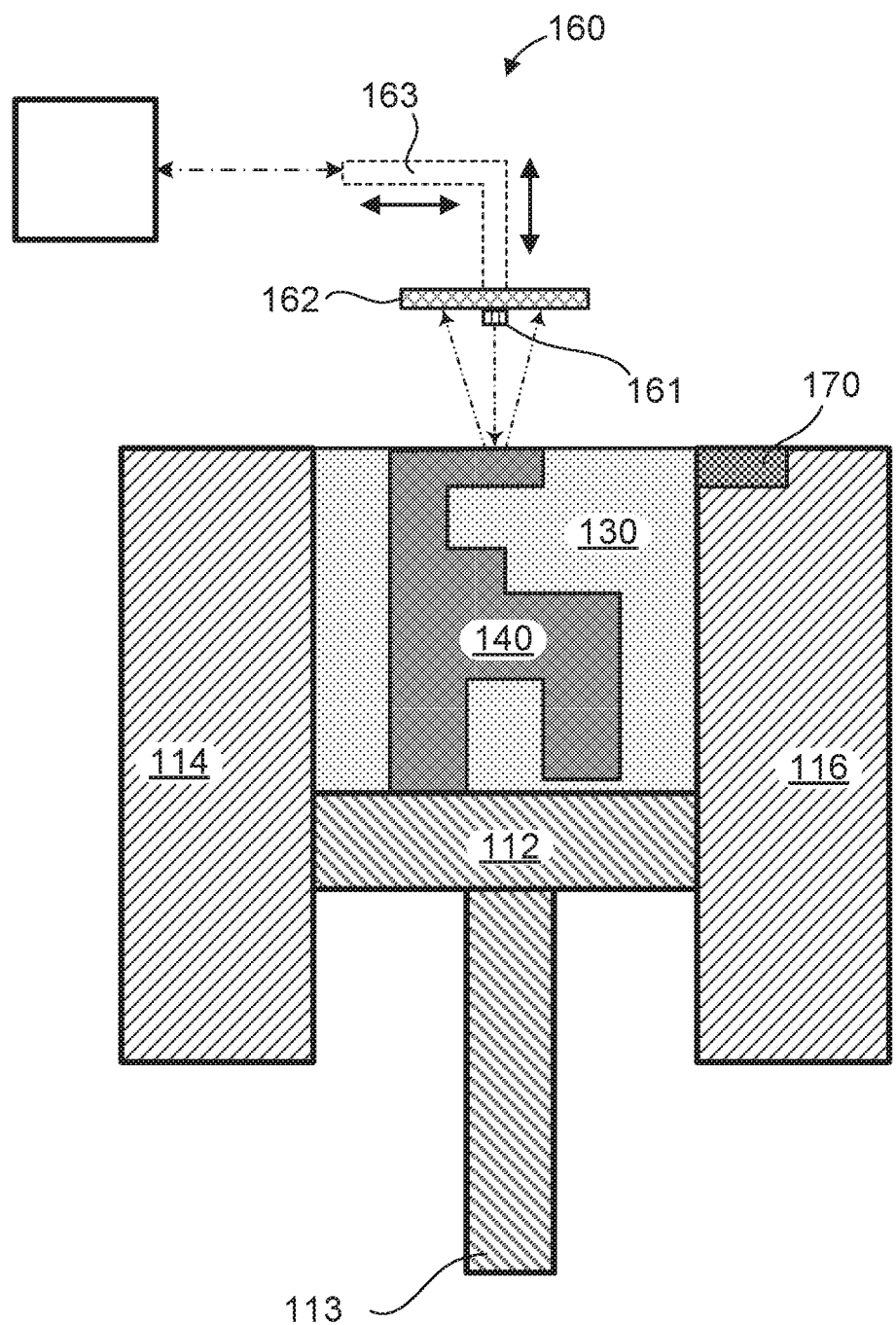
FIG. 3 illustrates a cross-sectional view of an additive manufacturing apparatus, in accordance with aspects described herein.

FIG. 3 illustrates a side, cross-sectional view of a system, in accordance with aspects described herein. The backscatter x-ray system 160 has been deployed over the part 140. The emitter 161 is activated and emits x-rays. The x-rays reflect off the part 140 and are detected by detector 162. The detector may be a two dimensional array of x-ray detecting elements. The backscattered x-rays may reflect off the surface (i.e., top layer) of part 140 and/or may at least partially penetrate part 140. The relative height of the emitter/detector may be adjusted by movable support 163. A higher position, with respect to the build platform 112 or part 140, of the emitter/detector may provide a wider field of view for the detector, whereas a lower position of the emitter/detector may enable deeper penetration or more focused scans of specific regions of part 140.

Figure 4:
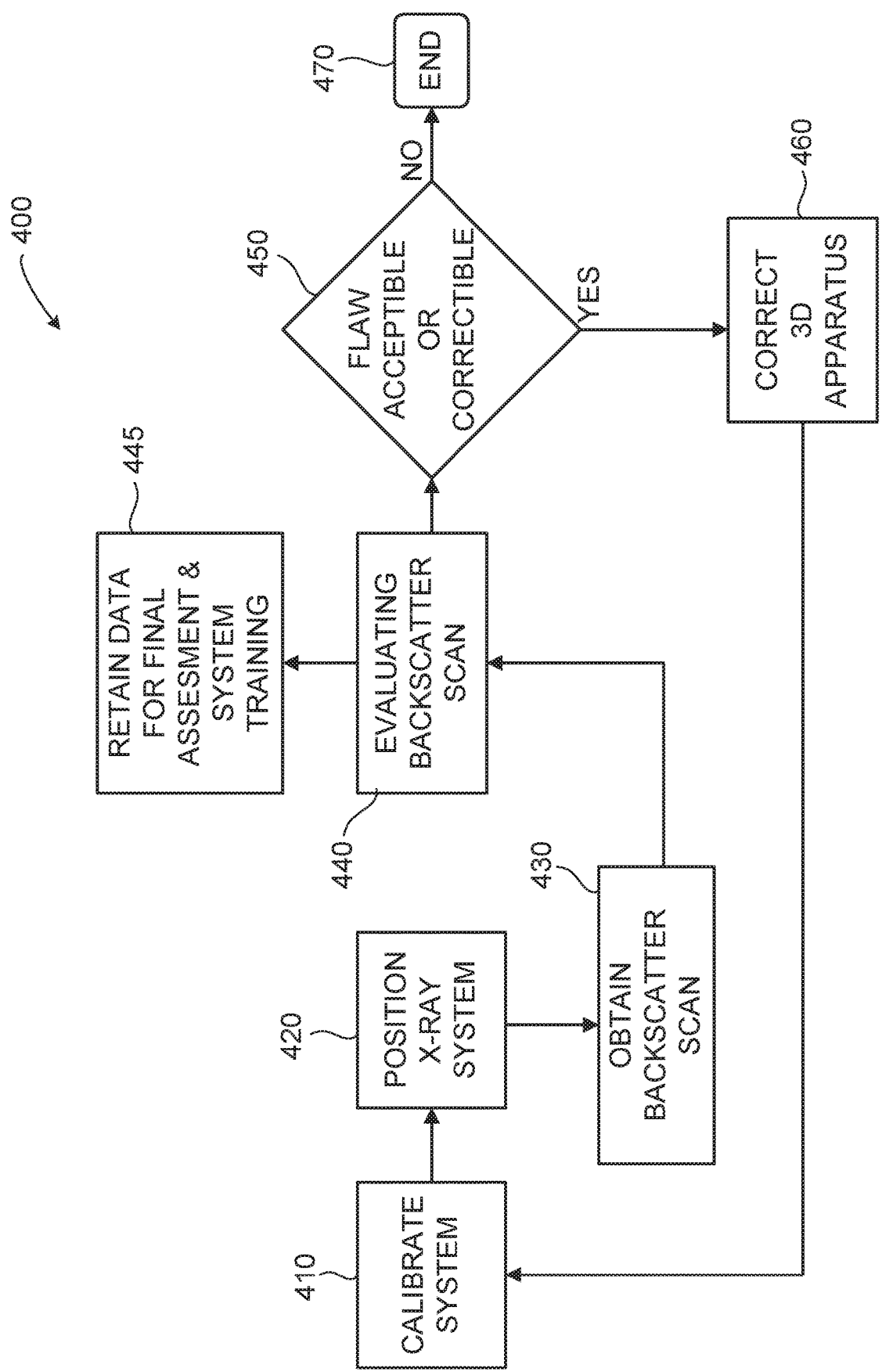
FIG. 4 is a flowchart of a data processing and scanning method, in accordance with aspects described herein.

FIG. 4 is a flowchart of the method 400 for inspection of additive manufactured parts and monitoring operational performance of the additive manufacturing apparatus 100, in accordance with aspects described herein. The data extracted during backscatter x-ray scanning can be used for real time quality control, final quality control and feedback process control to correct the laser or machine properties. In process (i.e., real time) machine control can be used to remove or cure flaws during the 3D build process. In step 410, the backscatter x-ray system 160 may be calibrated. The calibration block 170 is located so as to be within the field of view of backscatter x-ray detector 162 (or vice-versa) and a scan is initiated. The response is compared to a known good response and responses of known artificial flaws in the calibration block in order to detect, evaluate, classify and size the defect or measure the layer thickness. If there is a discrepancy, the backscatter x-ray system (or output thereof) is modified to correct the error. This will yield a very reliable and repeatable scanning process. As non-limiting examples, the height of the emitter and detector can affect the response thereof, or the amount of background radiation may be factors that affect the response of backscatter x-ray system 160. Calibration blocks 170 are provided to have an accurate and repeatable test for each layer, and to optimize the sensitivity of the scanner/detector, and to use known defects with known sizes so that the system can use their data for sizing and defect classification. The calibration block is also capable of defining critical values such as image contrast, range, level and signal-to-noise ratio (SNR) values. These known defects can be designed and modified according to the sensitivity and kind of defects needed to be detected and classified. For example, if the critical defect size is a void of 2 mm diameter, a void with 2 mm diameter can be artificially made in the calibration block 170 at different depths. The system calibrates before scanning to have its response accurately adjusted. Alternatively, a 2 mm void and a 2 mm inclusion can be detected in the calibration block 170, so that their response may be used for classifying these kinds of defects.

In positioning step 420, the movable support 163 is used to move the emitter and detector into a desired position. For example, the emitter 161 and detector 162 may be located at a specific height above the build platform or part 140, of the emitter and detector may be positioned at a specific x-y location with respect to the build platform. The movable support may also be configured to move the emitter and detector during a scanning operation. In obtaining step 430, a backscatter x-ray scan of the build platform area and parts 140 is obtained in real-time during an additively manufactured build process. The backscatter x-ray system 160 is used to obtain the backscatter x-ray scan or image.

In evaluating step 440, the backscatter x-ray scan (or image) is evaluated, typically by a processor. The scan is analyzed and evaluated for areas or regions that may indicate presence of a defect in the part 140. Advanced automated defect detection methods using complex image processing algorithms can be used in this step. For instance, the scan data may be evaluated to ascertain characteristics (dimensions, textures, layer thickness, composition, etc.) of the part(s) being printed and then subsequently compared to a 'golden standard', such as a computer-aided design (CAD) specification for the structure. The CAD specification may be a specification that the additive manufacturing apparatus uses in building the part. The comparison can assess whether the part is being built consistent with the CAD specification in order to identify possible distortions, deviations, defects or other flaws. Since, build quality is dependent on machine and material performance, the evaluation of the scans can additionally identify features in the data that suggest problems with the additive manufacturing apparatus, such as, lack of fusion, porosity or micro/macro cracks or other items that indicate a flaw. Thus, the data can be evaluated to not only detect errors in the part(s) being built as they are printed, and assign a part 'health' score to each part(s), but also monitor additive manufacturing apparatus health, indicating when the machine might require maintenance or adjustment and identifying what is needed for that maintenance/adjustment. In some examples, the evaluation is performed in real-time during the build process, though in other examples, the evaluation is performed at a later time. In step 445, the data is retained for final assessment, creating a statistical model and system training. The data in this step is retained in a memory for the final part/structure assessment, as well as for creating a statistical model, machine learning and system training. For example, the gathered data of the same layer of multiple defect-free parts can be used as an input to a machine learning algorithm such as artificial neural networks (ANNs) to train the algorithm to be used for defect detection and classification of parts for that specific layer. One aspect of the current method is that after detecting the flaw, the method classifies the flaw so that the corrective action or decision can be made accordingly. Data corresponding to each layer is aggregated into a group corresponding to each part, and in this way a three dimensional "picture" is formed of the multiple layers in each part.

In step 450, a determination is made as to whether an operational flaw with the additive manufacturing apparatus has occurred or a defect in the part has occurred, and if the flaw and/or defect is acceptable or correctable or if the layer thickness is acceptable. Different decision making algorithms such as binary hypothesis testing, or Bayesian hypothesis testing can be used and optimized using the statistical model in step 445. For example, if the defect is smaller than a predetermined amount (e.g., less than 0.5 mm), then the build process can continue. If the flaw is correctable, then step 460 is used to correct the flaw. If the defect was an unfused area, then the laser could be directed to re-target that flawed area. However, if the defect is neither acceptable nor correctable, then the part is discarded and the build process for that part ends with step 470.

Figure 5:
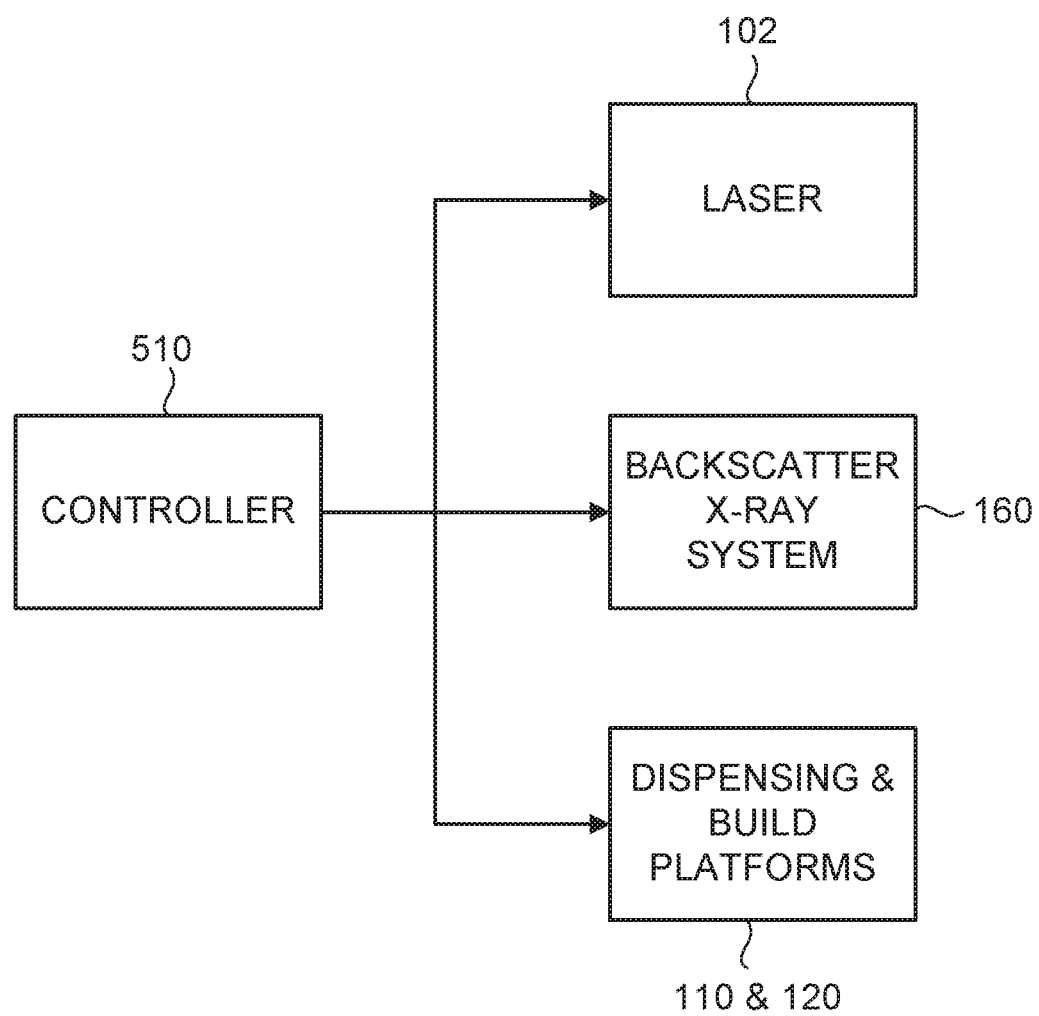
FIG. 5 illustrates a schematic representation of the control system and the additive manufacturing apparatus, in accordance with aspects described herein.

FIG. 5 illustrates a schematic representation of the control system and the additive manufacturing apparatus, in accordance with aspects described herein. Additive manufacturing apparatus 100 may include a control system including one or more controller(s) 510, including hardware and/or software for controlling functioning of some or all components of the additive manufacturing apparatus 100. Controller(s) 510 may control, for instance, operation of laser 102 (including laser power, laser speed, laser spot size, etc.), recoating blade position, speed or height, and dispensing and build platform operation (e.g., amount of height increase/decrease, etc.). In general, many operational characteristics of the apparatus may be controlled due to feedback obtained via backscatter x-ray system 160 and system 600, for example, laser power, laser speed, powder size, powder material, chamber temperature, laser spot size, or powder depth are a few examples of operational characteristics that can be modified as desired. In some embodiments, controller(s) 510 include one or more control data processing systems for controlling the print process and behavior of the other hardware of the printing apparatus. Control algorithms such as Proportional-Integral-Derivative (PID), Linear Quadratic Regulator (LQR), Fuzzy Logic Controller (FLC) and other suitable control algorithm can be used to calculate the multiple output parameters with respect to input data.

The backscatter x-ray system 160 may capture data in real-time during the build process. The data may then be evaluated, in real time, in one example, using one or more algorithms executed as software on a data processing system. The data processing system may be included as part of the apparatus 100, in one example. In other examples, the data processing system is in wired or wireless communication with backscatter x-ray system 160 responsible for acquiring the scan data, where the backscatter x-ray system communicates the data through one or more wired or wireless communication paths to the data processing system. The separate data processing system may be a controller 510 data processing system described above, or may be a different data processing system dedicated to evaluation of the acquired scan data.

In any case, the data processing system that obtains the scan data may evaluate the data, either separately or by one or more of various techniques for comparison with one or more three-dimensional CAD models, to determine whether the part(s) are being printed correctly. In a typical build setup, a designer of the parts to be printed may utilize software to build designs for all of the parts to be printed onto the build platform. Software for controlling the additive manufacturing apparatus may then (offline) 'slice' the 3D models of the part(s) to be printed into layers, with each layer to be printed as a 'pass' of the laser.

As described herein, layers of a build process may be backscatter x-ray scanned and the properties and characteristics of the printed materials may be compared to a CAD specification in order to assess the quality of the build and determine whether operational flaw(s) or defects have occurred. The scanning of one or more layers in real time during the additive manufacturing process, and the evaluation of the scan data, which may be in real-time during the build process or may be at a later time, provides online inspection of parts and process monitoring that facilitates assessment of the operational health of the additive manufacturing apparatus.

Figure 6:
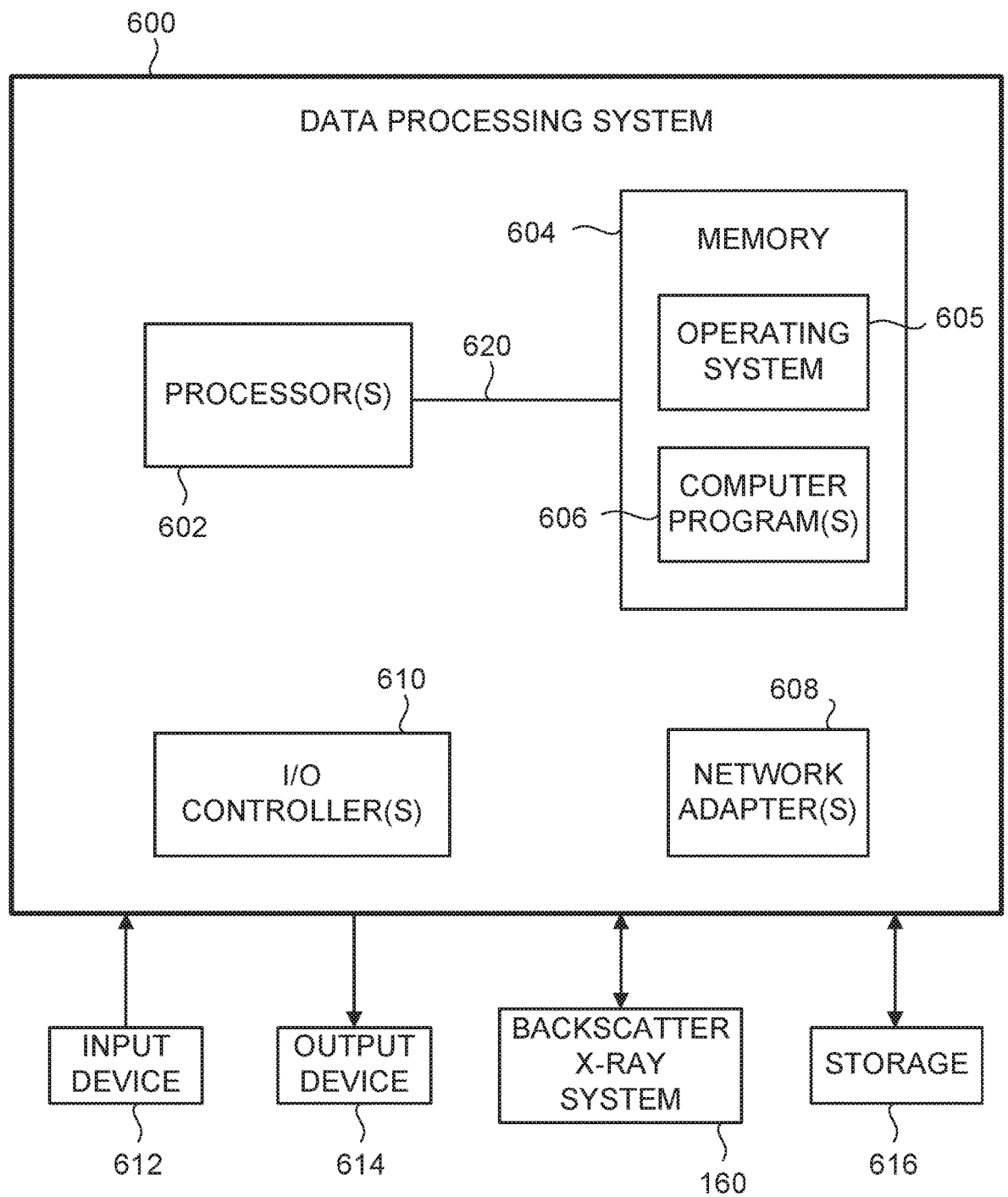
FIG. 6 illustrates one example of a data processing system to incorporate and use one or more aspects described herein.

FIG. 6 illustrates one example of a data processing system to incorporate and use one or more aspects described herein. Data processing system 600 is suitable for storing and/or executing program code, such as program code for performing the processes described above, and includes at least one processor 602 coupled directly or indirectly to memory 604 through, a bus 620. In operation, processor(s) 602 obtains from memory 604 one or more instructions for execution by the processors. Memory 604 may include local memory employed during actual execution of the program code, bulk storage, and cache memories which provide temporary storage of at least some program code in order to reduce the number of times code must be retrieved from bulk storage during program code execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606, such as one or more programs for obtaining scan data from the backscatter x-ray system 160, and one or more programs for evaluating the obtained scan data to determine whether operational flaws(s) have occurred with an additive manufacturing apparatus or defects have occurred in the parts, in accordance with aspects described herein.

Input/output (I/O) devices 612, 614 (including but not limited to keyboards, displays, pointing devices, etc.) and the backscatter x-ray system 160 may be coupled to the system 600 either directly or through I/O controllers 610. Network adapters 608 may also be coupled to the system to enable the data processing system to become coupled to other data processing systems through intervening private or public networks. Modems, cable modem and ethernet cards are just a few of the currently available types of network adapters 608. In one example, network adapters 608 and/or input devices 612 facilitate obtaining scan data of a build process in which a three-dimensional structure is printed.

Data processing system 600 may be coupled to storage 616 (e.g., a non-volatile storage area, such as magnetic disk drives, optical disk drives, a tape drive, cloud storage, etc.), having one or more databases. Storage 616 may include an internal storage device or an attached or network accessible storage. Computer programs in storage 616 may be loaded into memory 604 and executed by a processor 602 in a manner known in the art.

Additionally, data processing system 600 may be communicatively coupled to the backscatter x-ray system 160 via one or more communication paths, such as a network communication path, serial connection, or similar, for communicating data between data processing system 600 and the backscatter x-ray system 160. Communication may include acquisition by the data processing system of the data acquired by the backscatter x-ray system 160.

The data processing system 600 may include fewer components than illustrated, additional components not illustrated herein, or some combination of the components illustrated and additional components. Data processing system 600 may include any computing device known in the art, such as a mainframe, server, personal computer, workstation, laptop, handheld computer, tablet, smartphone, telephony device, network appliance, virtualization device, storage controller, etc. In addition, processes described above may be performed by multiple data processing systems 600, working as part of a clustered computing environment. Data processing system 600, memory 604 and/or storage 616 may include data compression algorithms specifically designed for 3D printing due to the large amount of data needed to be stored for each part.

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 7:
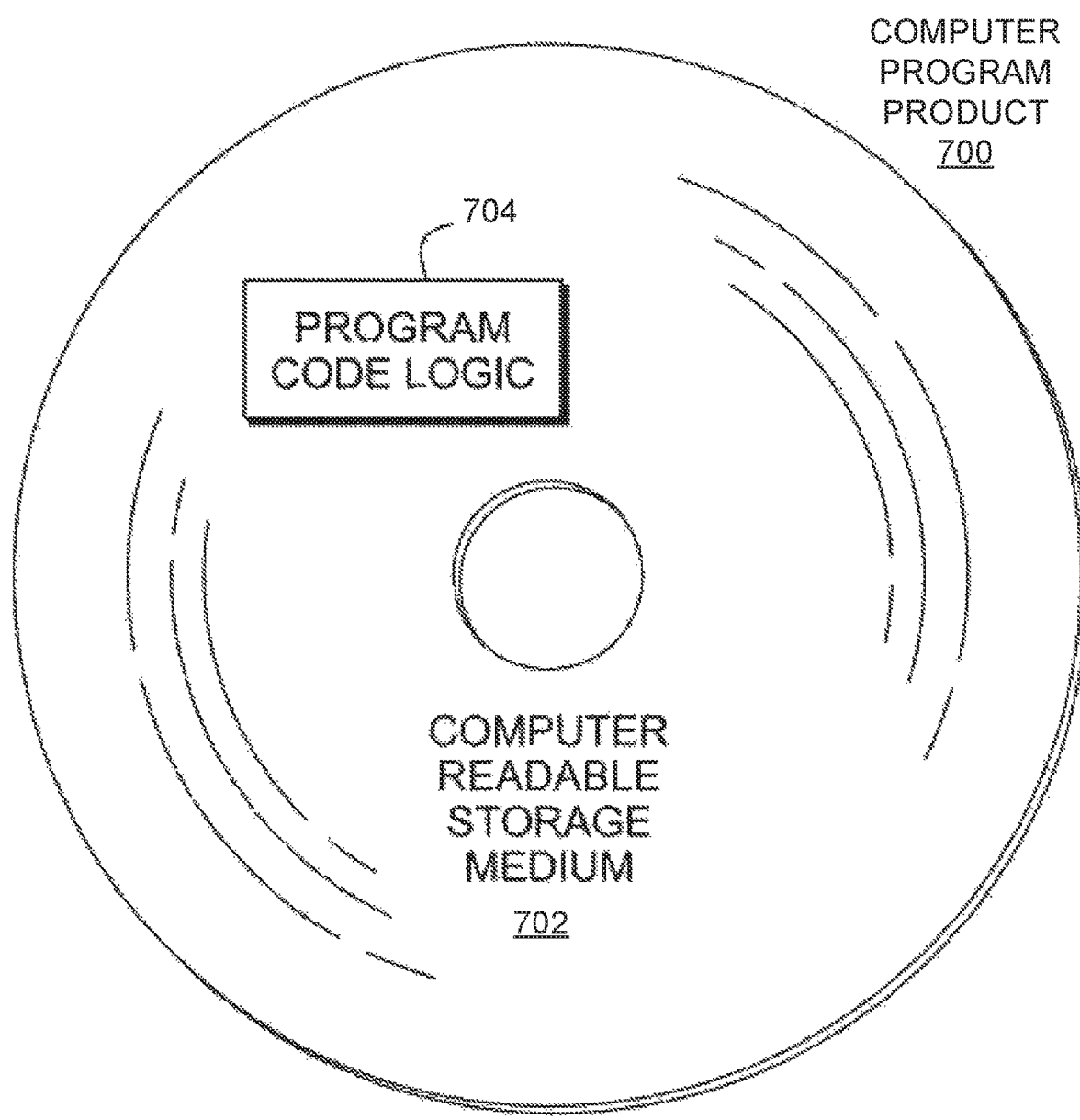
FIG. 7 illustrates one example of a computer program product to incorporate one or more aspects described herein.

Referring now to FIG. 7, in one example, a computer program product 700 includes, for instance, one or more computer readable media 702 to store computer readable program code means or logic 704 thereon to provide and facilitate one or more aspects of the present invention. Program code contained or stored in/on a computer readable medium 702 can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C #, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more data processing system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The method and system of the present invention not only aims at evaluating and modifying the 3D manufacturing apparatus, but is also designed to evaluate each 3D printed part in real time and after the build is completed. For example, the performance of a machine might be very satisfactory, but due to material or other issues some defects occur during the build. Non-destructive testing methods that have to be done to inspect each part in the past can now be eliminated using the inventive method and system, since the part is inspected/assessed as it is constructed. Non-destructive testing of completed 3D parts may be undesirable because, it is very difficult to perform NDT on the parts due to complex geometry, and complex material properties, and computed tomography (CT) is very time consuming, costly and has other disadvantages. In addition, if NDT is performed after the part/structure is built, and then it is decided to scrap the part, then much time has been lost.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed. Additionally, the terms "determine" or "determining" as used herein can include, e.g. in situations where a processor performs the determining, performing one or more calculations or mathematical operations to obtain a result.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for inspection of laser powder bed fusion additive manufactured parts and monitoring operational performance of a laser powder bed fusion additive manufacturing apparatus, the method comprising:
   obtaining, in real-time during a laser powder bed fusion additively manufactured build process, a backscatter x-ray scan of an area of a powder bed build platform, the powder bed build platform configured for supporting at least one part during the laser powder bed fusion additively manufactured build process;
   evaluating in real-time during the formation of a layer of the additive manufacturing build process, by a processor, the backscatter x-ray scan to detect in real-time operational flaws during the build process, the evaluating including:
      comparing one or more backscatter x-ray properties of the at least one part being built during laser powder bed fusion additively manufactured build process to a predefined computer-aided design specification of the at least one part, the predefined computer-aided design specification describing one or more target backscatter x-ray properties for the at least one part; and
   determining, based on the evaluating, in real-time during the formation of a layer of the additive manufacturing build process, whether an operational flaw with the laser powder bed fusion additive manufacturing apparatus occurs or a defect in the at least one part occurs.

2. The method of claim 1, further comprising a backscatter x-ray system having an emitter that emits x-rays and a detector that receives backscattered x-rays.

3. The method of claim 2, wherein the emitter and the detector of the backscatter x-ray system are located on a movable support located above the powder bed build platform, the movable support configured to raise and lower the emitter and the detector with respect to the powder bed build platform.

4. The method of claim 2, further comprising:
calibrating the backscatter x-ray system by scanning one or more calibration blocks, the one or more calibration blocks having at least one known defect.

5. The method of claim 2, further comprising, responsive to determining that the operational flaw or the defect has occurred, modifying the laser powder bed fusion build process, and wherein the modifying (i) terminates building the part which is determined to exhibit the operational flaw or the defect, or (ii) building at a location of the powder bed build platform at which the operational flaw is determined to be exhibited, or (iii) modifying a laser powder bed fusion additive manufacturing apparatus operational characteristic.

6. The method of claim 2, further comprising, responsive to determining that the operational flaw or the defect has occurred, modifying the laser powder bed fusion build process by modifying an operational characteristic of the laser powder bed fusion additive manufacturing apparatus, the operational characteristic comprising at least one of:
laser power, laser speed, powder size, powder material, chamber temperature, laser spot size, or powder depth.

7. The method of claim 1, wherein the operational flaw comprises a malfunction of the laser powder bed fusion additive manufacturing apparatus indicative that maintenance of the laser powder bed fusion additive manufacturing apparatus is necessary, or the defect comprises a porosity indication greater than a predetermined threshold, a lack of fusion, a micro crack or a macro-crack.

8. The method of claim 1, wherein the determining comprises determining, based on the comparison, whether the at least one part is accurate to the computer-aided design specification.

9. A method for inspection of laser powder bed fusion additive manufacturing apparatus additive manufactured parts and monitoring operational performance of a laser powder bed fusion additive manufacturing apparatus, the method comprising:
positioning an emitter and a detector of a backscatter x-ray system at a desired position with respect to a powder bed build platform of the laser powder bed fusion additive manufacturing apparatus, the desired position including at least one of a height above the powder bed build platform or an x-y location with respect to the powder bed build platform;
obtaining, in real-time during a laser powder bed fusion additively manufactured build process, a backscatter x-ray scan of an area of the powder bed build platform, the powder bed build platform configured for supporting at least one part during the laser powder bed fusion additively manufactured build process;
evaluating in real-time during the formation of a layer of the additive manufacturing build process, by a processor, the backscatter x-ray scan to detect in real-time operational flaws during the build process; and
determining, based on the evaluating, in real-time during the formation of a layer of the additive manufacturing build process, whether a defect in the at least one part occurs.

10. The method of claim 9 wherein the emitter emits x-rays and the detector receives backscattered x-rays.

11. The method of claim 10, wherein the emitter and the detector of the backscatter x-ray system are located on a movable support located above the powder bed build platform, the movable support configured to raise and lower the emitter and the detector with respect to the powder bed build platform.

12. The method of claim 10, further comprising:
calibrating the backscatter x-ray system by scanning one or more calibration blocks, the one or more calibration blocks having at least one known defect.

13. The method of claim 10, further comprising, responsive to determining that the defect has occurred, modifying the laser powder bed fusion additively manufactured build process, and wherein the modifying (i) terminates building the part which is determined to exhibit the defect, or (ii) modifying an additive manufacturing apparatus operational characteristic.

14. The method of claim 10, further comprising, responsive to determining that the defect has occurred, modifying the laser powder bed fusion additively manufactured build process by modifying an operational characteristic of the laser powder bed fusion additive manufacturing apparatus, the operational characteristic comprising at least one of:
laser power, laser speed, powder size, powder material, chamber temperature, laser spot size, or powder depth.

15. The method of claim 9, wherein the defect comprises a porosity indication greater than a predetermined threshold, a lack of fusion, a micro crack or a macro-crack.

16. The method of claim 9, wherein the evaluating further comprises comparing one or more backscatter x-ray properties of the at least one part as being built during a laser powder bed fusion build process to a computer-aided design specification describing one or more target backscatter x-ray properties for the at least one part, and wherein the determining comprises determining, based on the comparison, whether the at least one part is accurate to the computer-aided design specification.

* * * * *